(12) United States Patent
Bou-Ghannam et al.

(10) Patent No.: US 7,308,360 B2
(45) Date of Patent: Dec. 11, 2007

(54) TECHNIQUE FOR AUDIBLY PROVIDING DRIVING DIRECTIONS USING A MOBILE TELEPHONE

(75) Inventors: Akram A. Bou-Ghannam, Lake Worth, FL (US); Brent L. Davis, Deerfield Beach, FL (US); Peeyush Jaiswal, Boca Raton, FL (US); James R. Lewis, Delray Beach, FL (US); Fang Wang, Plano, TX (US)

(73) Assignee: International Business Machines Corporation, Armonk, NY (US)

( * ) Notice: Subject to any disclaimer, the term of this patent is extended or adjusted under 35 U.S.C. 154(b) by 288 days.

(21) Appl. No.: 11/083,425

(22) Filed: Mar. 18, 2005

(65) Prior Publication Data

US 2006/0212220 A1    Sep. 21, 2006

(51) Int. Cl.
*G01C 21/00* (2006.01)
(52) U.S. Cl. .................. 701/213; 701/200; 342/357.06
(58) Field of Classification Search ........ 701/200–202, 701/208–215; 340/988, 995.1; 342/357.06, 342/357.12
See application file for complete search history.

(56) References Cited

U.S. PATENT DOCUMENTS

| | | | |
|---|---|---|---|
| 6,269,303 B1 * | 7/2001 | Watanabe et al. ........... 701/209 |
| 6,674,849 B1 | 1/2004 | Froeberg | |
| 6,707,421 B1 * | 3/2004 | Drury et al. ............. 342/357.1 |
| 6,766,248 B2 * | 7/2004 | Miyahara ................... 701/208 |
| 2001/0029192 A1 | 10/2001 | Oh | |
| 2002/0055872 A1 | 5/2002 | Labrie et al. | |
| 2002/0164998 A1 | 11/2002 | Younis | |
| 2003/0139150 A1 | 7/2003 | Rodriguez et al. | |
| 2003/0218064 A1 | 11/2003 | Conner et al. | |
| 2004/0030493 A1 | 2/2004 | Pechatnikov et al. | |
| 2004/0204851 A1 | 10/2004 | Fukuyasu | |

OTHER PUBLICATIONS

Aquino, G., "Let Your Cellular Phone Do The Driving", PCWorld Computing Center, PCWorld, (Sep. 2004).

* cited by examiner

*Primary Examiner*—Yonel Beaulieu
(74) *Attorney, Agent, or Firm*—Akerman Senterfitt

(57) ABSTRACT

A method for providing driving directions can include the step of within a mobile telephone device, associating one or more of audio files with enabling GPS coordinates. The audio files can include digitally encoded speech that specify driving instructions. Current GPS coordinates for the mobile telephone device can be ascertained. When the current GPS coordinates match enabling GPS coordinates, the audio file associated with the enabling GPS coordinates can be played.

17 Claims, 3 Drawing Sheets

TECHNIQUE FOR AUDIBLY PROVIDING DRIVING DIRECTIONS USING A MOBILE TELEPHONE

BACKGROUND

1. Field of the Invention

The present invention relates to the field of mobile telephony and vehicle navigation and, more particularly, to a technique for audibly providing driving directions using a mobile telephone.

2. Description of the Related Art

A number of relatively new technologies have enabled drivers to navigate to desired destinations with the aid of navigational computing devices. One such technology embeds a navigation system inside a vehicle, which can include a visual map through which a present vehicle location can be displayed as the vehicle travels along a roadway. Directional indications can be visually and audibly provided by such an in-vehicle navigation system. Vehicle navigation systems can be expensive to purchase and install, however, which has prevented their wide-spread adoption within the consuming marketplace. Further, drivers of in-vehicle navigation equipped vehicles often fail to utilize the navigation system due to expensive monthly service charges and long-term navigational system contracts, which the drivers do not wish to incur.

To overcome these limitations, a number of alternatives have been attempted. One alternative is to provide a lower-cost after market navigation system that can be more easily added to a vehicle. While this solution can ease entry costs that are otherwise associated with installation and purchase of an in-vehicle navigation system, the after market navigation systems still require a monthly service cost to operate, which can result in significant expenses. Additionally, many after market vehicle navigation systems provide visual navigational queues through a tiny display, which can be difficult and even dangerous for drivers to utilize.

Another alternative, which can have an even lower cost associated with it is to utilize a personal data assistant (PAD) or notebook computer communicatively linked to or otherwise equipped with a global positioning system (GPS) device to provide a driver with undatable maps and driving instructions. Both of these solutions suffer from the same deficiencies as after market navigation systems. Service charges can be required for use, and the provided driving instructions can be presented in a distracting manner. For example, a driver attempting to look at a map or instructions presented upon the screen of a PAD can miss a desired exit, can become involved in an accident, or can simply become lost in the process of manipulating the direction providing device.

SUMMARY OF THE INVENTION

The present invention discloses a driving direction delivery solution that provides audible driving instructions from a mobile telephone in accordance with an embodiment of the inventive arrangements disclosed herein. More specifically, a GPS enabled mobile telephone capable of playing audible files, such as MPEG-1 layer 3 format (MP3) files, can be used for vehicle navigation purposes. A mobile telephone user can download a series of audio files, each containing a driving instruction. Each downloaded audio file can be associated with GPS coordinates or a GPS coordinate range. When the current location of the mobile telephone, as determined by the GPS components, is within a GPS coordinate range or approximately equals the GPS coordinates associated with an audio file, the audio file can be played.

It should be appreciated that the present solution permits mobile telephone users to be provided with driving instructions for any vehicle they are traveling within, which can be beneficial as compared to vehicle-specific navigational devices. Additionally, a mobile telephone owner utilizing the subject matter taught herein can download a series of driving instructions before traveling using capabilities inherent within an already owned device. These driving instructions can be played at a later time, even at times when the mobile telephone is not able to receive a signal from a mobile telephone tower. Accordingly, the solution presented does not require a constant connection to function. Hence, the service cost per user can be very low. For example, mobile telephone carriers may choose to provide the navigational service as a standard feature of a mobile telephony service package. In another example, a third party provider can provide the navigational service for a very modest charge, which may even be a free add-supported service.

The invention disclosed herein can be implemented in accordance with a variety of different aspects. For example, one aspect of the present invention discloses a mobile telephony device that includes GPS electronics, an audio transducer, and a data store. The GPS electronics can be configured to determine GPS coordinates of the mobile telephony device. The audio transducer can be configured to audibly present at least one audio file. The data store can be configured to store one or more audio files and associated enabling GPS coordinates. The mobile telephone device can be programmatically configured to compare GPS coordinates determined by the GPS electronics against enabling GPS coordinates stored within the data store. Upon a favorable comparison, the mobile telephone device can play the audio file associated with the favorably compared enabling GPS coordinates via the audio transducer.

Another aspect of the present invention can include a method for providing driving directions. The method can include the step of, within a mobile telephone device, associating one or more of audio files with enabling GPS coordinates. The audio files can include digitally encoded speech that specify driving instructions. Current GPS coordinates for the mobile telephone device can be ascertained. When the current GPS coordinates match enabling GPS coordinates, the audio file associated with the enabling GPS coordinates can be played.

It should be noted that various aspects of the invention can be implemented as a program for controlling computing equipment to implement the functions described herein, or a program for enabling computing equipment to perform processes corresponding to the steps disclosed herein. This program may be provided by storing the program in a magnetic disk, an optical disk, a semiconductor memory, any other recording medium, or can also be provided as a digitally encoded signal conveyed via a carrier wave. The described program can be a single program or can be implemented as multiple subprograms, each of which interact within a single computing device or interact in a distributed fashion across a network space.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

Figure 1:
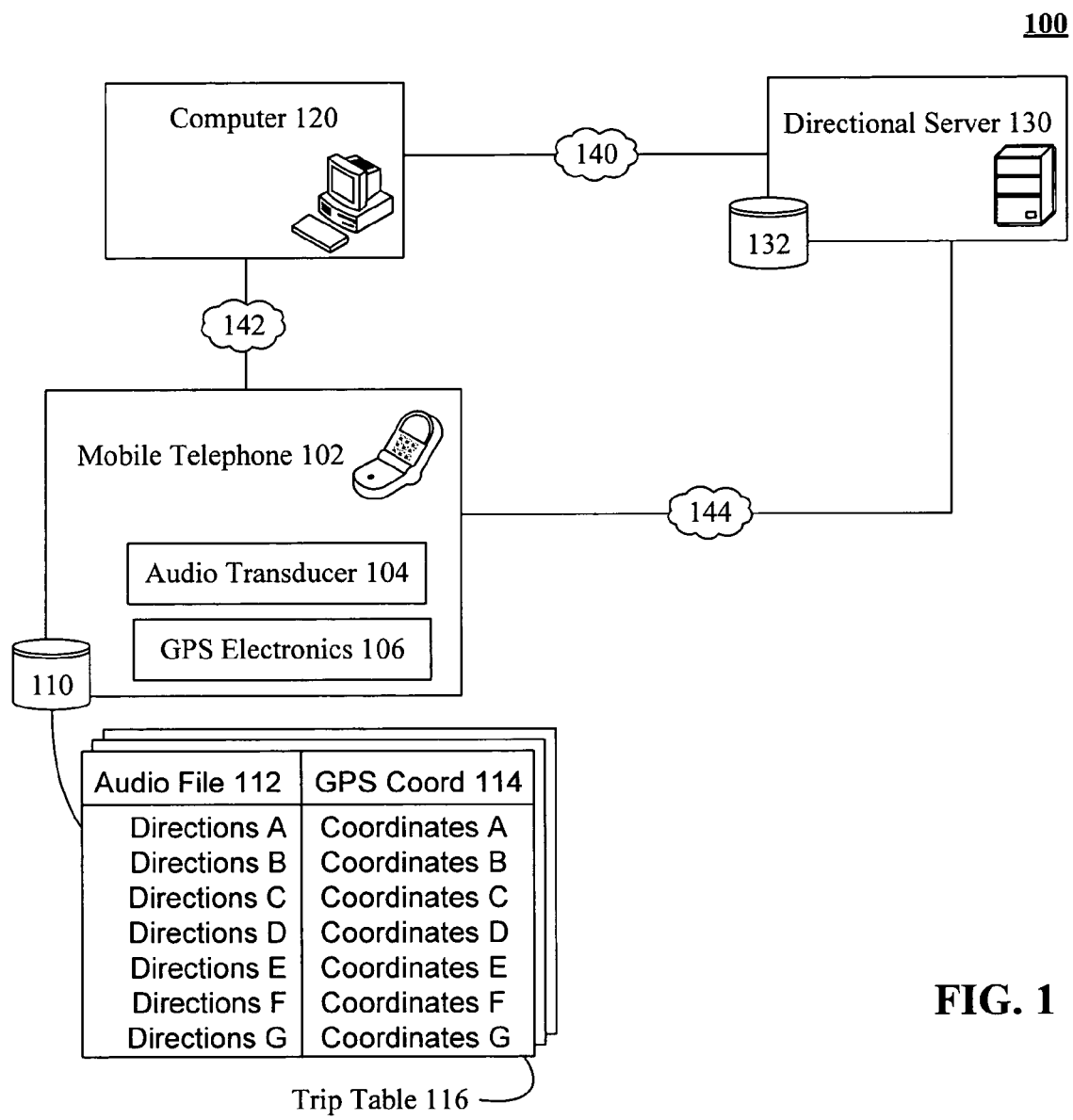
FIG. 1 is a schematic diagram illustrating a system for providing driving directions in accordance with an embodiment of the inventive arrangements disclosed herein.

FIG. 1 is a schematic diagram illustrating a system 100 for providing driving directions in accordance with an embodiment of the inventive arrangements disclosed herein. System 100 can include a directional server 130, a computer 120, and a mobile telephone 102.

The directional server 130 can be a computing device capable of providing driving instructions, driving maps, and other travel information when provided with a starting location and a destination location. The directional server 130 can utilize data contained within data store 132 to generate the driving instructions and related information. Additionally, user-specific travel information and user-profile information can be maintained in data store 132. The directional server 130 can be communicatively linked to computer 120 via network 140 and can be communicatively linked to mobile telephone 102 via network 144. Additionally, computer 120 and mobile telephone 102 can exchange data through network 142.

In one embodiment, the directional server 130 can be a Web server that provides driving directions to users interfacing with the directional server 130 through a Web site. The directional server 130 is not limited in this regard, however, and can in various other embodiments be implemented as a Web service, a distributed software component, a remote data service, and the like, each of which can provide directional information to computer 120 and/or mobile telephone 102.

The driving instructions provided by the directional server 130 can include spoken directions encoded within one or more audio files. The spoken instructions can be customized for a user-specified language. The audio files can be encoded in any of a variety of formats, including but not limited to, an MPEG-1 layer 3 (MP3) format, a WINDOWS Media Audio (WMA) format, an Audio Video Interleaved (AVI) format, a Waveform Audio (WAV) format, a telephony audio format (VOX), an Ogg Vorbis (OGG) format, and the like.

The directional server 130 can be configured to detect an audio format that is compatible with the mobile telephone 102 and can generate, convert, or otherwise adapt the audio files containing the driving instructions to the detected format. The directional server 130 can also provide software plug-in modules to the mobile telephone 102 and/or computer 120 so that the audio file receiving device can be software enhanced to play the audio files including the driving instructions.

The driving instructions provided by the directional server 130 can be directional or direction-less instructions. Direction-less instructions can be instructions, such as "turn east", "take exit 512," and the like, that are independent of a direction of travel. Directional instructions can be instructions, such as "turn left", "turn right", "you missed your exit", and the like, that are dependant upon the direction of travel. When directional instructions are provided by the directional server 130, multiple sets of conditionally enabled instructions can be provided, where the conditions pertain to the direction of travel.

The mobile telephone 102 can receive audio files 112 containing driving instructions along with associated GPS coordinates 114 produced by the directional server 130 and provided to the mobile telephone 102, either directly from the directional server 130 or indirectly from computer 120. The mobile telephone 102 can store this received driving information in data store 110, which can be a memory of the mobile telephone 102. Additionally, a series of conditionally enabled or trip specific audio files and associated GPS coordinates can be stored in data store 110.

Trip table 116, for example, can represent a currently enabled set of audio files 112 and GPS coordinates 114 established for a specific trip. Other trip tables 116 can be present within data store 110, which can be selectively enabled or disabled responsive to user selections, mobile telephone locations, and/or externally provided instructions.

The mobile telephone 102 can include audio transducer 104 for audibly presenting the audio files 112. The mobile telephone can also include GPS electronics 106 for determining location coordinates for the mobile telephone. These location coordinates can be compared against the GPS coordinates 114, using circuitry and software within the mobile telephone 102. When matches result from the comparisons, one or more events can be triggered, which can result in an associated audio file 112 being played via audio transducer 104. In one embodiment, the GPS electronics 106 can function independent of whether the mobile telephone is receiving a telephony signal.

As used herein, the mobile telephone 102 can include a hand-held communication device configured to wirelessly communicate with one or more ground stations, each ground station providing mobile telephony services for a geographic area or cell. In addition to the transceiver for communicating with the ground stations, the mobile telephone 102 can include additional communication equipment, such as BLUETOOTH, WIFI (802.11 protocol), infra-red (IR), or other transceiving electronics for wirelessly exchanging data with computer 120 and/or directional server 130. Further, communications can be established with the mobile telephone 102 and a remote data source using one or more communication ports (not shown), such as a serial port, a FIREWIRE port, a universal serial bus (USB) port, a compact flash port, a memory card port, and the like.

Data stores 110 and 132 can store information in any recording medium, such as a magnetic disk, an optical disk, a semiconductor memory, or the like. Further, each of the data stores 110 and 132 can utilize any information retention technique including a file-based storage technique or a database storage technique. Moreover, each of the data stores 110 and 132 can be a storage area fixed to a geographical location or a storage area distributed across a network space.

Networks 140, 142 and 144 can represent any communication mechanism capable of conveying digitally encoded information. Networks 140, 142 and 144 can include a telephony network such as a Public Switched Telephone Network (PSTN) or a mobile telephone network, a computer network such as a local area network or a wide area network, a cable network, a satellite network, a broadcast network, and the like. Further, networks 140, 142 and 144 can use wireless as well as line-based communication pathways. Networks 140, 142, and 144 can include not only long and intermediate distance communication pathways, but can also include one or more short-distance data pathways, such as in-device information buses, circuit board etched communication lines, communication cables such as FIREWIRE or USB cables, and the like. Moreover, digitally encoded information can be conveyed via networks 140, 142, and 144 in accordance with any communication protocol, such as a packet-based communication protocol or a circuit based communication protocol.

It should be appreciated that the arrangements shown in FIG. 1 are for illustrative purposes only and that the invention is not limited in this regard. Instead, system 100 is to include all derivative structures that one of ordinary skill in the art could use to implement the functionality detailed herein. For example, the computer 120 and directional server 130 can each be implemented in a distributed or centralized fashion, although each is illustrated as a single device. Additionally, GPS electronics 106 can be substituted with other location specifying electronics, such as telemetric electronics based upon signal strength and cell tower locations, and need not be based upon GPS specific technologies. Further, the audio transducer 104 may not include a speaker integrated within the mobile telephone 102, but can instead utilize speakers external to the mobile telephone 102 that receive audio transmitted by mobile telephone 102. For example, sound from the mobile telephone 102 can be played through headphones communicatively linked to the mobile telephone 102 through an audio/video port.

Figure 2:
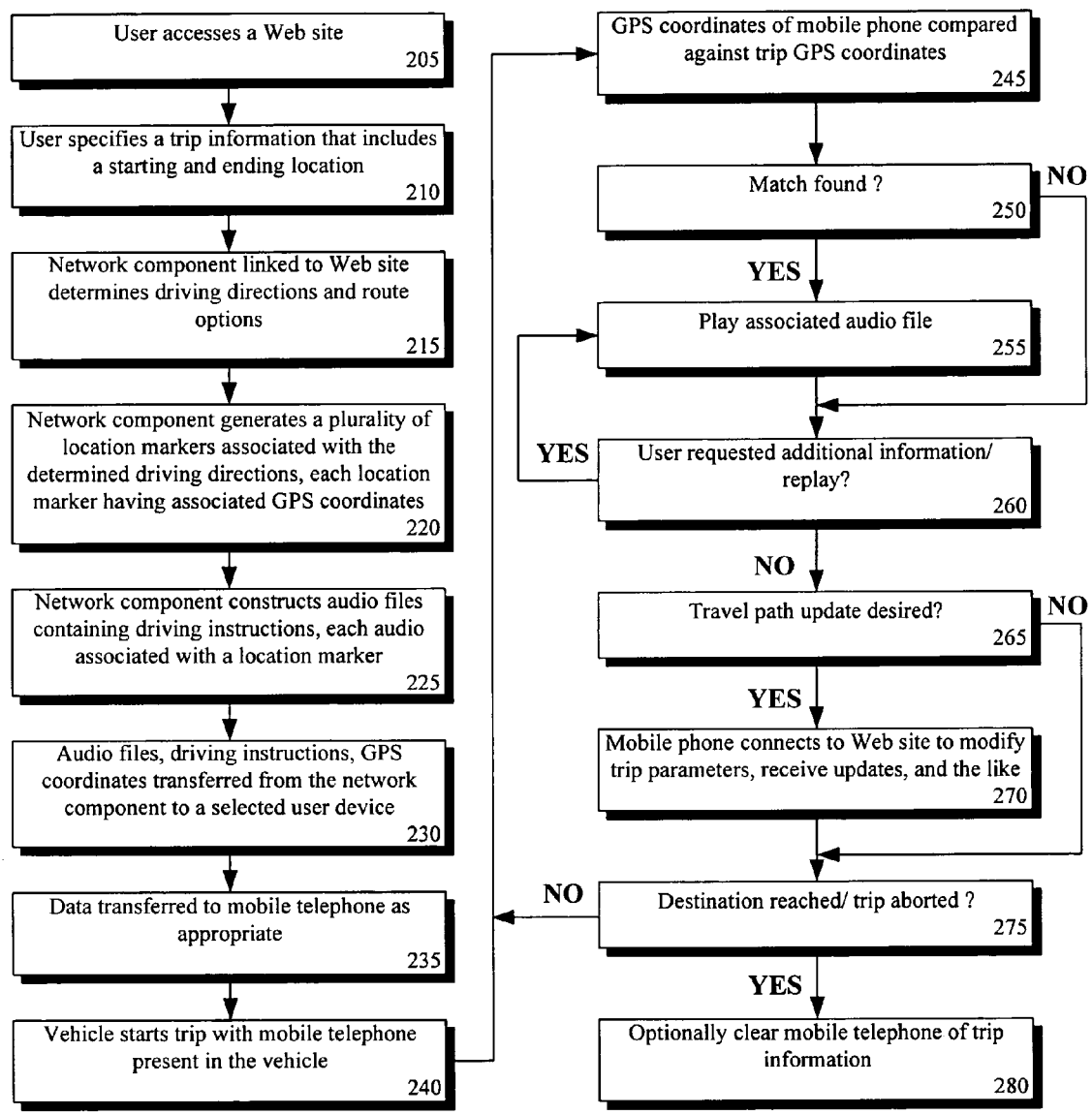
FIG. 2 is a flow chart illustrating a method for providing driving instructions in accordance with an embodiment of the inventive arrangements disclosed herein.

FIG. 2 is a flow chart illustrating a method 200 for providing driving instructions in accordance to an embodiment of the inventive arrangements disclosed herein. The method 200 can be performed in the context of system 100 or any other system in which driving instructions are to be audibly presented based upon location coordinates.

Method 200 can begin in step 205, where a user can access a Web site, using a computer with an Internet connection or through a mobile telephone. The mobile telephone can use a visual, voice, or multimodal browser to access the Web site. Accessing the Web site can require user registration and may require that accessing users pay a service fee.

In step 210, the user can specify trip information that includes a starting and ending point for a trip. In step 215, a network component linked to the Web site, such as a component of a Web server serving the Web site, can determine driving directions and route options for traveling from the starting point to the ending point. In step 220, the network component can also generate location markers associated with points along the determined driving pathway. Each location marker can be associated with a set of GPS coordinates. In step 225, the network component can construct audio files containing speech-based driving instructions and can associate each of these audio files with a location marker.

In step 230, the audio files, driving instructions, GPS coordinates, and the like can be transferred from the network component to a remote location, such as to the computing device accessing the Web site. In step 235, the transferred data can be further conveyed to a mobile telephone. In step 240, a vehicle that includes the mobile telephone can begin traveling from the designated starting point to the ending point.

In step 245, as the vehicle travels, GPS coordinates associated with the current position of the mobile telephone can be compared against GPS coordinates corresponding to the location markers. In step 250, when a match is found the method can proceed to step 255, where the associated audio file can be played. Otherwise, the method can proceed from step 250 to step 260.

In step 260, the mobile telephone device can check for user input. The user input can be, for example, a request to replay an audio file or a request for supplemental information regarding the audio file. When there is user input, the method can loop to step 255, where appropriate programmatic actions responsive to the user input can be taken by the mobile telephone. When no user input is received, the method can continue to step 265, where the mobile telephone can be checked for events relating to travel path update requests.

When the travel path is to be updated, the method can proceed from step 265 to step 270, where the mobile telephone can connect to the Web site. The Web site can modify trip parameters and audio files, can provide GPS coordinate updates, and can provide other trip related information to the mobile device. When the travel path is not to be updated, the method can proceed from step 265 to step 275. In step 275, a determination can be made as to whether the end point has been reached or whether the trip has been aborted. If not, the method can loop to step 245, where other GPS coordinates for the current location of the mobile telephone can be determined. If the trip has completed, the method can progress to step 280. In step 280, the mobile telephone can optionally be cleared of the no-longer needed trip information. Alternatively, the trip information can be disabled. New trip information can also be enabled or acquired from the Web site, such as trip information needed for a return trip.

Figure 3:
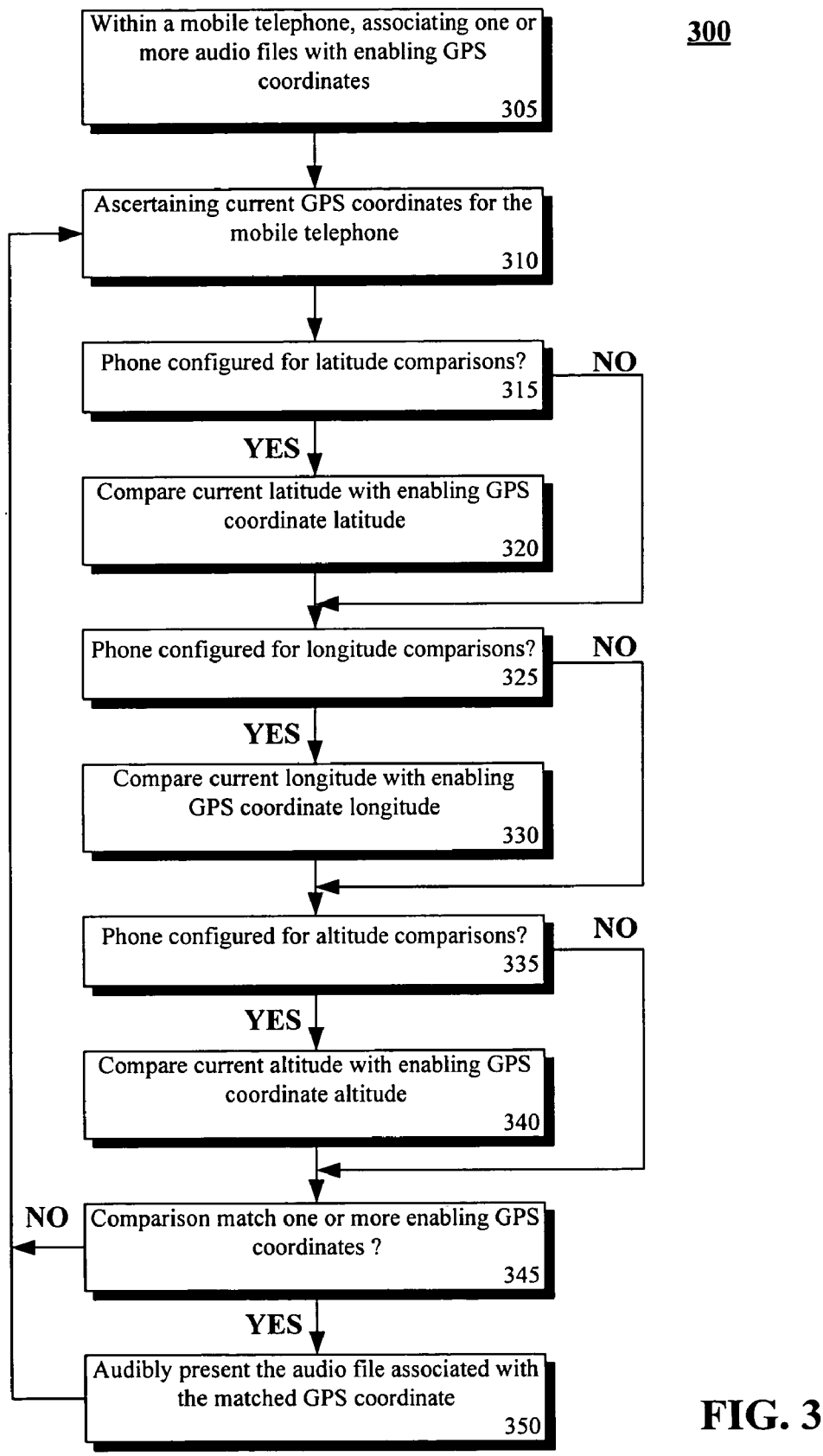
FIG. 3 is a flow chart illustrating a method for audibly playing files associated with location coordinates using a mobile telephone in accordance with an embodiment of the inventive arrangements disclosed herein.

FIG. 3 is a flow chart illustrating a method 300 for audibly playing files associated with location coordinates using a mobile telephone in accordance with an embodiment of the inventive arrangements disclosed herein. The method 300 can be performed in the context of system 100 or method 200, but is not to be construed as limited in this regard. That is, the method 300 can be performed in the context of any GPS enabled mobile telephone, having a memory for storing audio files and a transducer for playing the stored audio files.

Method 300 can begin in step 305, where one or more audio files contained within a mobile telephone can be associated with enabling GPS coordinates. In step 310, current GPS coordinates for the mobile telephone can be ascertained. It should be appreciated that mobile telephones can be configured in numerous fashions and have device-specific GPS capabilities, capabilities that can be user-configurable.

In step 315, a determination can be made as to whether the mobile telephone is configured for latitude-based comparisons. If so, in step 320, the current GPS coordinates can include a current latitude, which can be compared against enabling GPS latitude coordinates. For example, each set of enabling GPS coordinates can have a lower latitude range and an upper latitude range, against which the current latitude is compared.

In step 325, a determination can be made as to whether the mobile telephone is configured for longitude comparisons. If so, the method can proceed from step 325 to step 330, where longitude coordinates for the phone can be compared against enabling GPS longitude coordinates. In step 335, a determination can be made as to whether the mobile telephone is configured for altitude comparisons. If so, altitude coordinates for the phone can be compared against enabling GPS altitude coordinates, as shown by step 340.

When the comparisons of steps 320, 330, and/or 340 match one or more enabling GPS coordinates, the method can proceed to step 350. Otherwise, the method can proceed from step 345 to step 310. In step 350, the audio file associated with the GPS coordinates can be audibly presented. The method can loop from step 350 to step 310, where additional GPS coordinates for the mobile telephone can be determined.

The present invention may be realized in hardware, software, or a combination of hardware and software. The present invention may be realized in a centralized fashion in one computer system, or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof. Accordingly, reference should be made to the following claims, rather than to the foregoing specification, as indicating the scope of the invention.

What is claimed is:

1. A mobile telephony device comprising:
    GPS electronics configured to determine GPS coordinates of the mobile telephony device, wherein the UPS electronics operate independent of transceiver operations of the mobile telephony device so that the mobile telephony device is capable of comparing GPS coordinates and responsively audibly presenting audio files without being communicatively linked to a telephony network;
    an audio transducer configured to audibly present at least one audio file;
    a data store configured to store a plurality of audio files and associated enabling GPS coordinates, wherein said mobile telephone device is programmatically configured to:
        compare GPS coordinates determined by the GPS electronics against enabling GPS coordinates stored within the data store; and
        responsive to a favorable comparison, audibly present an audio file associated with the favorably compared enabling GPS coordinates via the audio transducer.

2. The mobile telephony device of claim 1, wherein said plurality of audio files comprise digitally encoded speech that specify driving instructions.

3. The mobile telephony device of claim 2, further comprising:
    an interface to a remotely located computer, wherein the plurality of audio files and associated enabling GPS coordinates are provided to the mobile telephony device over the interface.

4. The mobile telephony device of claim 3, wherein said interface comprises:
    a transceiver configured to wirelessly interface with the remotely located computer.

5. The mobile telephony device of claim 2, wherein the plurality of audio files are organized within a plurality of different sets of audio files, wherein each set of audio files is selectively enableable by the mobile telephony device, wherein only those enabling GPS coordinates associated with audio files included in a set of audio files that are enabled are compared against coordinates determined by the GPS electronics.

6. The mobile telephony device of claim 1, further comprising:
    a web browsing interface configured to provide a starting location and an ending location for a driving trip to a remotely located web site, wherein the plurality of audio files and associated enabling GPS coordinates are generated based upon the starting location and the ending location.

7. A method for providing driving directions comprising the steps of:
    within a mobile telephone device, associating a plurality of audio files with enabling GPS coordinates, said audio files including driving instructions;
    ascertaining current GPS coordinates for the mobile telephone device; and
    when the current GPS coordinates match at least one enabling GPS coordinate, audibly presenting the audio file associated with the enabling GPS coordinate,
    wherein the ascertaining and presenting steps occur independent of the mobile telephone device being communicatively linked to a telephony network.

8. The method of claim 7, wherein each of the plurality of audio files is associated with a range of at least two GPS coordinates, wherein the current GPS coordinates match the at least one enabling GPS coordinate when a current GPS coordinate is between the range.

9. The method of claim 8, wherein the at least two GPS coordinates comprise at least four GPS coordinates that include two latitude coordinates establishing a latitude range and two longitude coordinates establishing a longitude range, wherein the current GPS coordinates include a current OPS latitude and a current GPS longitude, wherein in order for the current GPS coordinates to match the at least one enabling GPS coordinate, the current OPS latitude must be between the latitude range and the current GPS longitude must be between the longitude range.

10. The method of claim 9, wherein the at least four GPS coordinates comprise at least six GPS coordinates that include two altitude coordinates establishing an altitude range, wherein the current GPS coordinates include a current GPS altitude, wherein in order for the current GPS coordinates to match the at least one enabling GPS coordinate, the current GPS altitude must be between the altitude range.

11. The method of claim 7, further comprising the steps of:
    wirelessly linking the mobile telephone to a remotely located computing device; and
    conveying the plurality of audio files and enabling GPS coordinates from the remotely located computing device to the mobile telephone.

12. The method of claim 11, wherein the audio files and enabling GPS coordinates are generated by a web site configured to provide driving directions.

13. The method of claim 12, further comprising the steps of:
    providing a starting location and an ending location to the web site; and said web site dynamically generating the audio files and enabling GPS coordinates based upon the starting location and the ending location.

14. The method of claim 7, further comprising the steps of:
   detecting a deviation from a driving pathway; and
   responsively updating the plurality of audio files and associated enabling GPS coordinates based upon the deviation detecting step.

15. The method of claim 14, wherein the detecting occurs automatically based upon current GPS coordinates of the ascertaining step.

16. The method of claim 14, wherein the updating step further comprises the steps of:
   wirelessly linking the mobile telephone to the web site; and
   retrieving new audio files and associated enabling GPS coordinates from the web site.

17. A machine-readable storage having stored thereon, a computer program having a plurality of code sections, said code sections executable by a machine for causing the machine to perform the steps of:
   within a mobile telephone device, associating a plurality of audio files with enabling GPS coordinates, said audio files including driving instructions;
   ascertaining current GPS coordinates for the mobile telephone device; and
   when the current GPS coordinates match at least one enabling GPS coordinate, audibly presenting the audio file associated with the enabling GPS coordinate,
   wherein the ascertaining and presenting steps occur independent of the mobile telephone device being communicatively linked to a telephony network.

* * * * *